United States Patent [19]

Guettouche et al.

[11] Patent Number: 4,957,793

[45] Date of Patent: Sep. 18, 1990

[54] WASTE PIPE SYSTEM COMPRISING PLASTIC PIPE PARTS MADE OF THERMOPLASTIC MATERIAL WITH SOUND-PROOFING PROPERTIES

[75] Inventors: Ali Guettouche, Haren; Jürgen Graafmann, Lingen, both of Fed. Rep. of Germany

[73] Assignee: Wavin B. V., Netherlands

[21] Appl. No.: 282,865

[22] Filed: Dec. 9, 1988

Related U.S. Application Data

[63] Continuation-in-part of Ser. No. 76,908, Jul. 23, 1987, abandoned.

[30] Foreign Application Priority Data

Jul. 23, 1986 [NL] Netherlands ............... 8601910

[51] Int. Cl.$^5$ ............................. F16L 9/22
[52] U.S. Cl. .................... 428/36.4; 138/155; 138/174; 428/36.9; 428/219
[58] Field of Search ........... 428/36.4, 36.9, 219; 138/155, 174

[56] References Cited

U.S. PATENT DOCUMENTS

| | | | |
|---|---|---|---|
| 4,385,136 | 5/1983 | Ancker et al. | 523/215 |
| 4,403,007 | 9/1983 | Coughlin | 428/96 |
| 4,407,987 | 10/1983 | Crocker et al. | 523/222 |

FOREIGN PATENT DOCUMENTS 1594773 4/1987 United Kingdom.

*Primary Examiner*—James Seidleck
*Attorney, Agent, or Firm*—Wigman & Cohen

[57] ABSTRACT

A waste pipe system of an injection moulded or extruded pipe part of thermoplastic material with sound-proofing properties having a weight per unit area of at least 8 kg/m$^2$. The weight per unit area is adjusted by incorporating a filler in the plastic, preferably barium sulphate is used as such a filler. The density of the plastic pipe part is comprised between 1.8 and 2.7, preferably between 1.8 and 2.0 g/cm$^3$.

Suitable thermoplastic materials are PVC, polyolefins and ABS (acrylonitrile-butadiene-styrene) copolymer, particularly PVC or polypropylene.

The plastic pipe part may also be a socket or a double sided socket.

7 Claims, No Drawings

WASTE PIPE SYSTEM COMPRISING PLASTIC PIPE PARTS MADE OF THERMOPLASTIC MATERIAL WITH SOUND-PROOFING PROPERTIES

This application is a continuation-in-part of Ser. No. 076,908, filed on July 23, 1987, now abandoned.

BACKGROUND OF THE INVENTION

The invention relates to a waste pipe system of plastic pipe parts made of thermoplastic material with sound-proofing properties suitable for transporting liquids in waste pipe systems, the inside of the plastic pipe part coming into contact with the liquid.

Such plastic pipe parts made of a substantially plasticizer free polyvinyl chloride with sound-proofing properties for transporting liquids in waste pipe systems is known.

To reduce the noise nuisance, however, the plastic pipe part has to be encased in a sound-proofing layer made of a soft foam plastic having open pores and containing an inorganic filler, the foam plastic having a continuous outer surface.

Such plastic pipe parts present the great disadvantage that the manufacturing costs are very high since, on the one hand, to manufacture it use has to be made of a plastic pipe part manufactured in the normal manner and, on the other hand, use has to be made of a sheathing of foam plastic to be manufactured in a separate step.

SUMMARY OF THE INVENTION

The primary object of the invention is therefore to provide a substantially plasticizer free plastic pipe part in which it is no longer necessary to apply a separate foam plastic layer to the plastic pipe part while considerably reducing the nuisance experienced hitherto when liquids flow through such plastic pipe parts.

This object is achieved according to the invention in that in a waste pipe system comprising a plurality of extruded or injection molded thermoplastic pipe parts, said thermoplastic material is characterized by the absence of plasticizers and selected from the group consisting of polyvinylchloride, polyolefin and acrylonitrile butadiene styrene copolymer (ABS), the inner surface of said thermoplastic pipe part coming into contact with the liquid waste, the level of noise in such a pipe system when conveying liquid waste through the pipes being reduced by using a pipe of thermoplastic material wherein the weight per unit area of the plastic pipe part is at least 8 kg/m$^2$ and the density is between 1.8 and 2.7 g/cm$^3$.

It has been found that if a weight per unit area of at least 8 kg/m$^2$ is used, a plastic conduit system consisting of pipes and accessories can be formed in which the pipe wall not only transports the water to be discharged, but also appreciably reduces the level of noise produced under those circumstances.

More particularly, it has been found that the level of noise decreases in logarithmic proportion as the weight per unit area increases.

The density of the plastic pipe part is advantageously at least 1.8 g/cm$^3$ since in this manner the required weight per unit area of a plastic pipe part can be achieved with relatively thin walls.

Preferably, the density of the plastic of the plastic pipe part is between 1.8 and 2.7, and more preferably between 1.8 and 2.0 g/cm$^3$.

Such a density offers the great advantage that such a plastic pipe part can be used for waste systems which meet the requiements of varying temperature fluctuations, transport of water at elevated temperature and mechanical durability.

The weight per unit area of the pipe wall of said plastic pipe part is expediently adjusted by a correct choice of the ratio of thermoplastic material and filler, in which connection barium sulphate may be mentioned in particular as filler since this filler is not poisonous. Barium sulphate manufactured by a chemical route (the so-called "blanc fixe") is preeminantly suitable especially because of the better processing properties for extruding pipes from thermoplastic material and for injection moulding of accessories made of such thermoplastic materials.

Suitable thermoplastic materials are, in particular, polyvinyl chloride in the form of homopolymers or copolymers, polyolefins such as polyethylene and polyproylene and also acrylonitrile-butadiene-styrene (co)-polymers, the so-called ABS. Mixtures of polymers such as polyvinyl chloride with ABS are also very suitable.

Since plasticizer free polyvinyl chloride pipes according to the invention meet the requirements which are imposed on plastic pipes for waste pipe systems, it will be obvious that, if desired, the waste pipe systems can be manufactured from substantialy plasticizer free polyvinyl chloride instead of from polypropylene used hitherto.

It will be obvious that known additives such as stabilizers, lubricants, substances having flame-extinguishing properties and substances improving impact strength can be added to the composition of thermoplastic material and filler. The quantities thereof should be chosen in a manner such that the weight per unit area and the specific gravity according to the invention are, of course, maintained. A pipe part of the invention may also be a socket pipe part or double sided socket pipe part.

DESCRIPTION OF PREFERRED EMBODIMENTS

The invention will now be explained by reference to a number of exemplary embodiments in which said tubes and accessories are investigated for noise reduction and suitability for discharge in waste systems.

To determine these properties, the following tests were used.

A pipe system was tested for noise in a chamber having a volume of 30 m$^3$; the equivalent sound absorption area was 1.6 m$^2$. Two walls of the chamber had a wall thickness of 24 cm, 1 wall a thickness of 11.5 cm, while the floor and the ceiling consisted of reinforced concrete slabs. The fourth wall was formed by a 10 cm thick plaster wall to which the pipe system according to the invention was attached.

Above this chamber there was a sound-insulated bathtub which was connected to the pipe system according to the invention under test. A measurement was made of the discharge sound from the bathtub (discharge speed 120 to 140 sec) in the middle of the chamber with a B and K precision noise level meter. The noise level was measured in dB (A) and each value was converted to an equivalent sound absorption area of 10 m².

As a reference use was made of a conduit system of cast iron (diameter 110.0 mm, wall thickness 3.5 mm), the measured noise level of such a cast iron pipe as described above being 41.5 dB (A).

A pipe system manufactured from plastic pipe parts according to the invention was also investigated for use in waste systems in an arrangement according to DIN 19,560, FIG. 1. Water was passed through this arrangement 300 times in surges at 95° C. with a flow rate of 30 L/min for 1 minute. After a pause of 1 minute, water at room temperature ("cold tap water") was passed through for 1 minute at a rate of 30 L/min followed by a 1 minute pause after which water at 95° C. was passed through under the same conditions as described above. The time duration of this cyclic test was approximately 20 hours. After this water at 90° C. was passed continuously through the arrangement at a rate of 30 L/min for 20 hours. During and after completion of this test (cycle test) a check was made for leakage from the pipe joints and for sag of the pipe in the horizontal section.

The advantage of a waste pipe system according to the invention appears from the following table showing some properties of extruded smooth plastic pipe.

The average noise level difference is the difference measured between 125 Hz and 4000 Hz.

TABLE

| Pipe material | WALL THICKNESS mm | Weight per unit area kg/m² | Noise level dB (A) | Average noise level difference dB cast iron/plastic pipe |
|---|---|---|---|---|
| 1 Cast Iron | 3,5 | about 36 | 49,5 | — |
| 2 PVC/BaSO₄ | 8,2 | 14,9 | 45 | +3 |
| 3 PVC/BaSO₄ | 5,3 | 9,8 | 47,5 | +1,5 |
| 4 PVC/CaCO₃ | 8,2 | 13,9 | 46 | +2 |
| 5 PP/talc | 8,2 | 8,9 | 48 | 0 |
| 6 PP/talc | 5,3 | 6,2 | 51,5 | −3 |
| 7 PVC-pressure | 5,3 | 7,6 | 52,5 | −1 |
| 8 PP-ED | 2,7 | 2,6 | 58 | −7,5 |
| 9 PVC-foam | 3,2 | 3,0 | 58 | −6,5 |

EXAMPLE 1

A composition was manufactured in a known manner which consisted of 60.0 parts by weight of plasticizer free PVC (K-value=67), 5.0 parts by weight of additives (lead stabilizers and glycerol monostearate) and 40 parts by weight of barium sulphate, which composition was extruded to form pipes with a diameter of 110 mm and a measured wall thickness of 5.2 mm. The weight per unit area of the pipe wall was 9.8 kg/m² and the specific gravity was 1.9 g/cm³. In the noise test the noise level was 39.5 dB (A), while no leakage occurred in the cycle test; the sag was 5 mm (maximum permitted value is 11 mm).

EXAMPLE 2

Pipes were extruded from the composition of Example 1 with a diameter of 110 mm and a measured wall thickness of 7.8 mm. The weight per unit area of the pipe wall was 14.9 kg/cm² and the specific gravity (as in Example 1) was 1.9 g/cm³. A value of 37.0 dB (A) was measured in the noise test, while the result of the cycle test was the same as that in Example 1.

EXAMPLE 3

Double sided sockets were manufactured from an injection moulding composition consisting of 75 parts by weight of plasticizer free PVC (K-50), 6.0 parts by weight of additives (lead stabilizers and glycerol monostearate), 25 parts by weight of ABS and 60 parts by weight of barium sulphate. The weight per unit area was 15.0 kg/m² and the specific gravity was 1.8 kg/cm³. For the noise test a number of sockets were placed between or in the pipe arrangement, the pipes of exemplary embodiment 2 being used. The noise level was 37.4 dB (A). Just as in exemplary embodiments 1 and 2, no leakage occured during and after the cycle test.

EXAMPLE 4

After mixing 100 parts by weight of plasticizer free polypropene with 220 parts by weight of barium sulphate, pipes were extruded with a diameter of 110 mm and a wall thickness of 7.0 mm. The weight per unit area was 14.0 kg/cm² and the specific gravity was 2.0 g/cm³. The noise level in the noise test was 37.7 dB (A) and the result of the cycle test was good.

EXAMPLE 6

110 mm pipes made of an extrusion composition (in parts by weight) of 70 parts of plasticizer free PVC (K=67), 5 parts of additives, 30 parts of ABS and 100 parts of barium sulphate with a weight per unit area of 12.0 kg/cm² and a specific gravity of 2.0 gave a value of 38.5 dB (A) in the noise test.

The result of the cycle test was identical to that of Example 1.

As stated above, a cast iron system (pipe diameter=110 mm, wall thickness=3.5 mm) gave a noise test of 41.5 dB (A) as reference value, while plasticizer free PVC pipes (diameter=110 mm, wall thickness=3.5 mm) gave a value of 44.5 dB (A) in the noise test.

What is claimed is:

1. A waste pipe system for discharging hot and cold waste water comprising a plurality of extruded or injection molded thermoplastic pipe parts, said thermoplastic material being characterized by the absence of plasticizers and selected from the group consisting of polyvinylchloride, polypropylene and acrylonitrile butadiene styrene copolymer (ABS), the inner surface of said thermoplastic pipe part coming into contact with the liquid waste, the outer surface of said thermoplastic pipe part characterized by the absence of a soundproofing casing, the level of noise in such a pipe system when conveying waste liquid through the pipes being reduced by using a pipe of thermoplastic material wherein the weight per unit area of the plastic pipe part is at least 8 kg/m² and the density is between 1.8 and 2.7 g/cm³.

2. A waste pipe according to claim 1, wherein the density of the plastic pipe part is 1.8 to 2.0 g/cm³.

3. A waste pipe system according to claim 1, wherein barium sulphate is added to adjust the weight per unit area.

4. A plastic pipe part according to claim 1, wherein the plastic of the pipe part is polypropylene.

5. A waste pipe system according to claim 1 wherein said thermoplastic material is polyvinylchloride.

6. A waste pipe system according to claim 1 wherein said thermoplastic pipe parts are able to withstand hot water at 90° C. or more passing therethrough for 20 hours without leaking and with a sag of less than 11 mm.

7. A waste pipe system according to claim 5 wherein said thermoplastic pipe parts are able to withstand hot water at 90° C. or more passing therethrough for 20 hours without leaking and with a sag of less than 11 mm.

* * * * *